US012661629B2

(12) United States Patent
Hu et al.

(10) Patent No.: US 12,661,629 B2
(45) Date of Patent: Jun. 23, 2026

(54) SYNTHESIS APPARATUS, SYNTHESIZER AND SYNTHESIS METHOD

(71) Applicant: BGI SHENZHEN, Shenzhen (CN)

(72) Inventors: Ding-Long Hu, Shenzhen (CN); Dong Cai, Shenzhen (CN); Feng Wang, Shenzhen (CN); Mengzhe Shen, Shenzhen (CN); Yong Wang, Shenzhen (CN); Xiang-Er Jiang, Shenzhen (CN); Jun Wang, Shenzhen (CN); Yue Shen, Shenzhen (CN)

(73) Assignee: BGI SHENZHEN, Shenzhen (CN)

( * ) Notice: Subject to any disclaimer, the term of this patent is extended or adjusted under 35 U.S.C. 154(b) by 529 days.

(21) Appl. No.: 18/208,806

(22) Filed: Jun. 12, 2023

(65) Prior Publication Data

US 2023/0321626 A1     Oct. 12, 2023

Related U.S. Application Data

(63) Continuation-in-part of application No. PCT/CN2021/076015, filed on Feb. 8, 2021.

(51) Int. Cl.
*B01J 19/00*      (2006.01)
*B01L 3/00*       (2006.01)
*G01N 35/04*      (2006.01)

(52) U.S. Cl.
CPC ..... *B01J 19/0046* (2013.01); *B01L 3/502715* (2013.01); *G01N 35/04* (2013.01); *B01L 2200/16* (2013.01); *B01L 2300/0636* (2013.01)

(58) Field of Classification Search
CPC ............ B01J 19/0046; B01J 2219/0054; B01J 2219/00608; B01J 2219/00686;
(Continued)

(56) References Cited

U.S. PATENT DOCUMENTS

2003/0017455 A1    1/2003  Webb
2004/0265838 A1    12/2004 Goldberg et al.
(Continued)

FOREIGN PATENT DOCUMENTS

CN      101205518 A    6/2008
CN      106168626 A    11/2016
(Continued)

*Primary Examiner* — Charles Capozzi
*Assistant Examiner* — Michael Stanley Gzybowski
(74) *Attorney, Agent, or Firm* — ScienBiziP, P.C.

(57)               ABSTRACT

Provided is a synthesis apparatus for synthesizing biomacromolecules. The synthesis apparatus includes a feeding apparatus, a recognition apparatus, a reaction apparatus, a sorting device, and a transfer device. The feeding apparatus includes a transporting assembly that can simultaneously transporting biochips. The recognition apparatus recognizes an identification of each biochip on the transporting assembly and feed back an identification information to a control device. The reaction apparatus includes various reaction vessels for performing synthesis reactions on the biochips. The sorting device includes various first sorting assemblies located on a side of the transporting assembly and correspond to the reaction vessels. The first sorting assemblies sort the chips on the transporting assembly to the reaction vessels corresponding to the current synthesis reactions when controlled by the control device. The transfer device transfers the biochips in the reaction vessels to the feeding device. Further provided are a synthesizer and a synthesis method.

17 Claims, 13 Drawing Sheets

(58) Field of Classification Search
     CPC ............. B01J 2219/00722; B01J 19/00; B01L
                          3/502715; B01L 2200/16; B01L
                 2300/0636; G01N 35/04; G01N 35/02;
                 G01N 2035/00158; G01N 2035/0475;
                 G01N 35/00732; C07H 1/00; C07H 21/04
     See application file for complete search history.

(56)                    References Cited

U.S. PATENT DOCUMENTS

2013/0047399  A1     2/2013  Jeon et al.
2015/0238920  A1     8/2015  Curran et al.

FOREIGN PATENT DOCUMENTS

CN          108642159  A     10/2018
CN          111359555  A      7/2020
CN          112159751  A      1/2021

SYNTHESIS APPARATUS, SYNTHESIZER AND SYNTHESIS METHOD

FIELD

The subject matter relates to synthesis of biomacromolecules, and more particularly, to a synthesis apparatus, a synthesizer, and a synthesis method of biomacromolecules.

BACKGROUND

Common biomacromolecules include proteins, nucleic acids (DNA, RNA, etc.), and carbohydrates. Most biomacromolecules are polymerized from simple constituent structures. The constituent unit of protein is amino acid, and the constituent unit of nucleic acid is nucleotide. The biomacromolecules can be synthesized from simple structures within organisms. If the biomacromolecules need to be synthesized artificially, a special instrument such as a synthesizer, is needed.

Taking DNA synthesis as an example, the DNA synthesis refers to the artificial connection of deoxynucleotides one by one to obtain DNA strands according to a preset sequence of nucleotides. For example, a single-stranded DNA sequence CGTGCA can be synthesized from a left side to a right side.

The existing synthesizer includes fixing an oligonucleotide single strand on a glass synthesis column, immersing the synthesis column in a container, and then adding various corresponding nucleotide reagents to the container, so that the single-stranded oligonucleotides can be continuously extended according to a required sequence. However, the principle and process of such synthesizer is complex, the synthesis flux is low, and the consumption of reagents is large. In addition, during the synthesis process of biomacromolecules, the synthesis cycle is long, and the target synthesis task cannot be changed.

SUMMARY

To overcome at least a portion of the above shortcomings, a synthesis apparatus, a synthesizer, and a synthesis method are needed.

A synthesis apparatus for synthesizing biomacromolecules, which includes a feeding device, a recognition device, a reaction device, a sorting device, and a transfer device. The feeding device includes a transporting assembly configured to simultaneously transport a plurality of biochips. The recognition device is configured to identify an identification of each of the biochips located on the transporting assembly and feed back an identification information to a control device. The reaction device includes a plurality of reaction vessels in which synthesis reactions are performed on the biochips. The sorting device includes a plurality of first sorting assemblies located on a side of the transporting assembly and corresponding to the reaction vessels, the first sorting assemblies are configured to sort the biochips located on the transporting assembly to the reaction vessels, and each of the reaction vessels corresponding to a current synthesis reaction performed on a respective one of the biochips when controlled by the control device. The transfer device is configured to transfer the biochips in the reaction vessels to the feeding device.

Furthermore, each of the first sorting assemblies includes a site sensor and a selection device corresponding to the site sensor, the site sensor is configured to sense whether one of the biochips has been transported to the site sensor and send a site sensing information to the control device, the selection device is configured to transfer the one of the biochips to a respective one of the reaction vessels when controlled by the control device.

Furthermore, the selection device includes a gas supply device on a side of the transporting assembly and a storage device on another side of the transporting assembly, the gas supply device is configured to blow the one of the biochips to the storage device when controlled by the control device, the storage device is configured to transfer the one of the biochips to a respective one of the reaction vessels.

Furthermore, the synthesis apparatus further includes a discharge sensor and a first recovery vessel, wherein the sorting device further includes a second sorting assembly; the discharge sensor is located on a side of the recognition device away from the first sorting assemblies, and is configured to sense whether one of the biochips has been transported to a preset position and transmit a discharge sensing information to the control device; the second sorting assembly is located between the discharge sensor and the recognition device and corresponds to the first recovery vessel, the second sorting assembly is configured to sort the one of the biochips to the first recovery vessel when controlled by the control device.

Furthermore, the transfer device further includes a negative pressure reflux device and a reflux storage device; the negative pressure reflux device is connected to the first recovery vessel, and is configured to transport the one of the biochips in the first recovery vessel to the reflux storage device when controlled by the control device; the reflux storage device is configured to place the one of the biochips from the reflux storage device to the feeding device.

Furthermore, the synthesis apparatus further includes a residue sensor and a second recovery vessel, wherein the residue sensor is located at an end of the first sorting assemblies away from the recognition device, and is configured to sense whether one of the biochips has been sent to a predetermined position and transmit a residue sensing information to the control device; the second recovery vessel is placed at an end of the transporting assembly away from the feeding device, and is configured to receive one of the biochips from the transporting assembly which is not successfully sorted; the negative pressure reflux device is further configured to transport the one of biochips in the second recovery vessel to the reflux storage device when controlled by the control device.

Furthermore, the synthesis apparatus further includes a waste recovery vessel, wherein the sorting device further includes a third sorting assembly, the third sorting assembly is located between the recognition device and the first sorting assemblies and corresponds to the waste recovery vessel; the third sorting assembly is configured to sort one of the biochips which is determined as a waste into the waste recovery vessel when controlled by the control device.

Furthermore, the synthesis apparatus further includes a finished material recovery vessel, wherein the sorting device further includes a fourth sorting assembly, the fourth sorting assembly is located between the recognition device and the first sorting assemblies and corresponds to the finished material recovery vessel; the fourth sorting assembly is configured to sort one of the biochips which completes all synthesis reactions to the finished material recovery vessel when controlled by the control device.

A synthesizer is provided, which includes the above-mentioned synthesis apparatus, a control device configured to control the synthesis apparatus, and an input member and an output member each connected to the control device. The control device is configured to execute corresponding programs to control the synthesis apparatus to operate according to a content input from the input member, and display relevant information on the output member.

A synthesis method of biomacromolecules is provided, which includes:

transporting, by a transporting assembly, a plurality of biochips, wherein a plurality of first sorting assemblies corresponding to a plurality of reaction vessels is arranged on a side of the transporting assembly;

identifying an identification of each of the biochips located on the transporting assembly and generating an identification information accordingly;

determining a synthesis sequence and a current synthesis reaction of each of the biochips according to the identification information;

when one of the biochips has been transported to one of the first sorting assemblies corresponding to one of the reaction vessels for performing the current synthesis reaction, controlling the one of the first sorting assemblies to sort the one of the biochips to the corresponding one of the reaction vessels;

performing the synthesis reaction in the corresponding one of the reaction vessels.

In the synthesizer and the synthesis method, multiple biochips placed on the transporting assembly can be simultaneously sorted by the first sorting assemblies arranged on a side of the transporting assembly, which improves the sorting efficiency of the biochips and shortening the synthesis cycle. In addition, since the reaction vessels correspond to the first sorting assemblies, the biochip may be sorted to the corresponding reaction vessel according to the identification information of the biochip. During the synthesis process, even when the synthesis sequence of the biochip is modified or added, the modified or newly added synthesis sequence may be adapted by changing the sorting order, so as to achieve a higher degree of freedom of synthesis.

Figure 1:
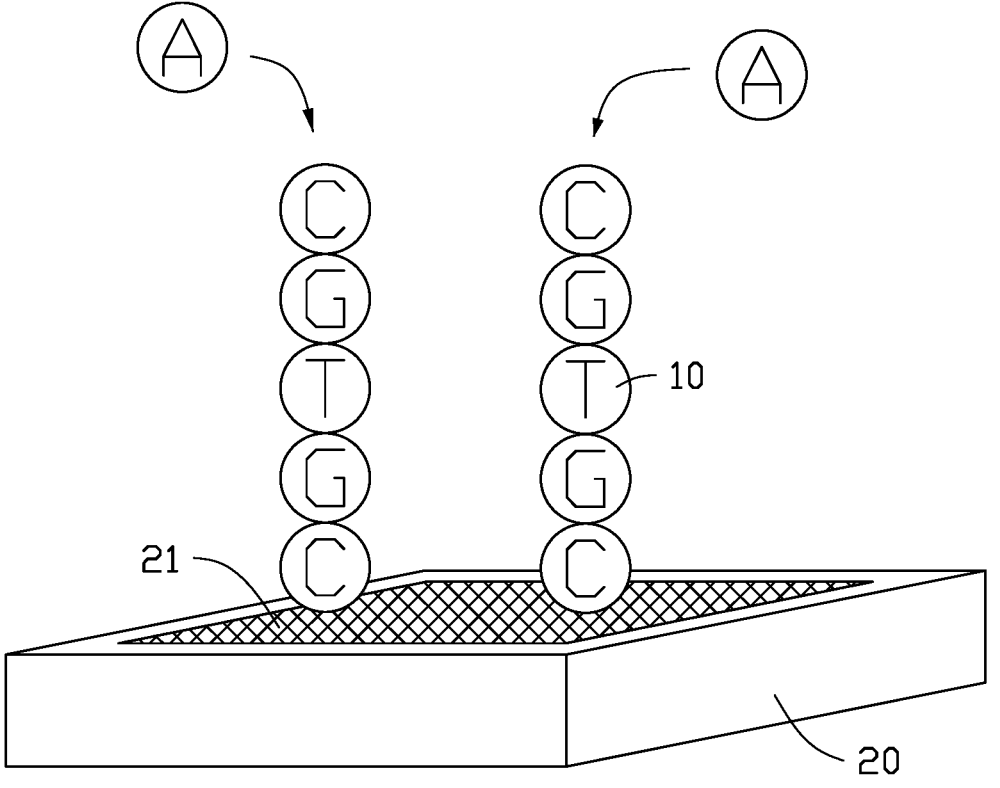
FIG. 1 is a diagrammatic view showing oligonucleotides synthesized by a biochip with identification according to the present disclosure.

The following specific embodiments will further explain the application in combination with the above drawings.

Implementations of the application will now be described, by way of embodiments only, with reference to the drawings.

Symbol Description of Main Components:

oligonucleotide single strand 10; biochip 20; identification 21; synthesizer 30; housing 31; display 32; input member 33; control device 34; synthesis apparatus 35; channel 36; feeding device 351; recognition device 352; reaction device 353; sorting device 354; transfer device 355; transporting assembly 3511; guide rail 3512; conveying belt 3513; first step motor 3514; bottom plate 35121; cover plate 35122; limit plate 35123; feeding groove 35151; vibrating disc 3515; guide member 3516; vibrating rail 35152; image capturing member 3521; reaction vessel 3531; synthesis reaction column 35311; sealing cover 35312; opening and closing driver 3532; positioning body 3533; container driver 3534; first sorting assembly 3541; site sensor 35411; selection device 35412; gas supply device 35413; storage device 35414; nozzle 35415; switch 35416; storage bin 35417; lifting member 35418; lifting driver 35419; second step motor 35419a; screw rod 35419b; stopper 35418a; hopper 3551; first hopper driver 3552; second hopper driver 3553; third hopper driver 3554; slide rail 35521; fixing pillar 35522; connecting member 35523; first driver 35524; fourth hopper driver 3555; base 35551; power member 35552; slide member 35553; discharge sensor 356; first recovery vessel 357; second sorting assembly 3542; reflux storage device 3556; residue sensor 358, second recovery vessel 359; storage portion 35561; waste recovery vessel 35a; finished material recovery vessel 35b; third sorting assembly 3543; fourth sorting assembly 3544.

DETAILED DESCRIPTION

Implementations of the present disclosure will now be described, by way of embodiments only, with reference to the drawings. The described embodiments are only some embodiments of the present disclosure, rather than all the embodiments. Based on the embodiments of the present disclosure, other embodiments obtained by ordinary skilled in the art without creative work fall within the scope of the claims.

It should be noted that when a component is referred to as being or "mounted on" another component, the component can be directly on another component or a middle component may exist therebetween. When a component is considered to be "arranged on" another component, the component can be directly on another component or a middle component may exist therebetween.

Unless otherwise defined, all technical terms used herein have the same meaning as commonly understood by one of ordinary skill in the art. The technical terms used herein are not to be considered as limiting the scope of the embodiments. The term "and/or" as used herein means any combinations of one or more related listed items.

A synthesizer provided by the present disclosure may be used to synthesize biomacromolecules, including but not limited to proteins, nucleic acids (DNA, RNA, etc.), carbohydrates, etc. A carrier for the synthesis of the biomacromolecules is a biochip. The biomacromolecules are fixed on a surface of the biochip, and are continuously extended in the synthesizer according to a required sequence to obtain a required macromolecule structure.

Referring to FIG. 1, taking the synthesis of an oligonucleotide primer as an example, oligonucleotide single strands 10 are fixed on the surface of the biochip 20. A number of oligonucleotide single strands may be fixed on the surface of biochip 20 (two oligonucleotide single strands are shown in the figure). Each oligonucleotide single strand is continuously extended by the synthesizer of the present disclosure according to the required sequence. Before the synthesizer of the present disclosure is used, a small segment of short strand of the oligonucleotide single strand may be pre-fixed on the surface of the biochip 20. Or, a specific biochemical adaptor may be arranged on the surface of the biochip 20, and the required biomacromolecule structure may be obtained by continuously extending the pre-fixed short strand of the oligonucleotide single strand or the specific biochemical adaptor. An identification 21 is provided on the biochip 20, which is shown in the shaded portion of the figure. The identification 21 is the identity of the corresponding biochip 20, which is used to distinguish the biochip 20 from other biochips 20. The identification 21 may be represented by a two-dimensional code, a barcode, an RFID tag, or other existing methods. In other embodiments, the identification 21 may also be arranged on another specific location or several other specific locations of the biochip 20.

Figure 2:
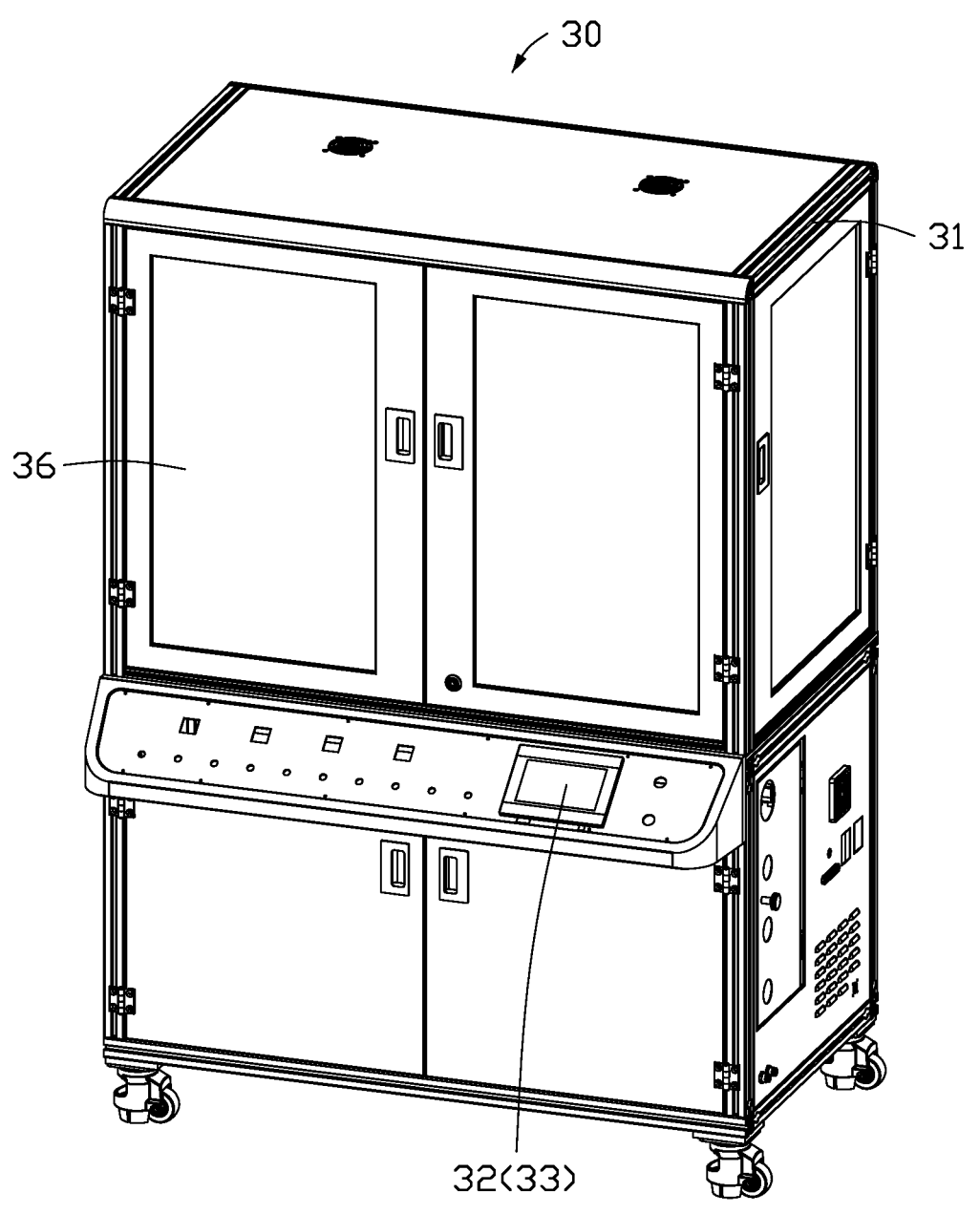
FIG. 2 is a diagrammatic view showing an appearance of a synthesizer according to the present disclosure.
Figure 3:
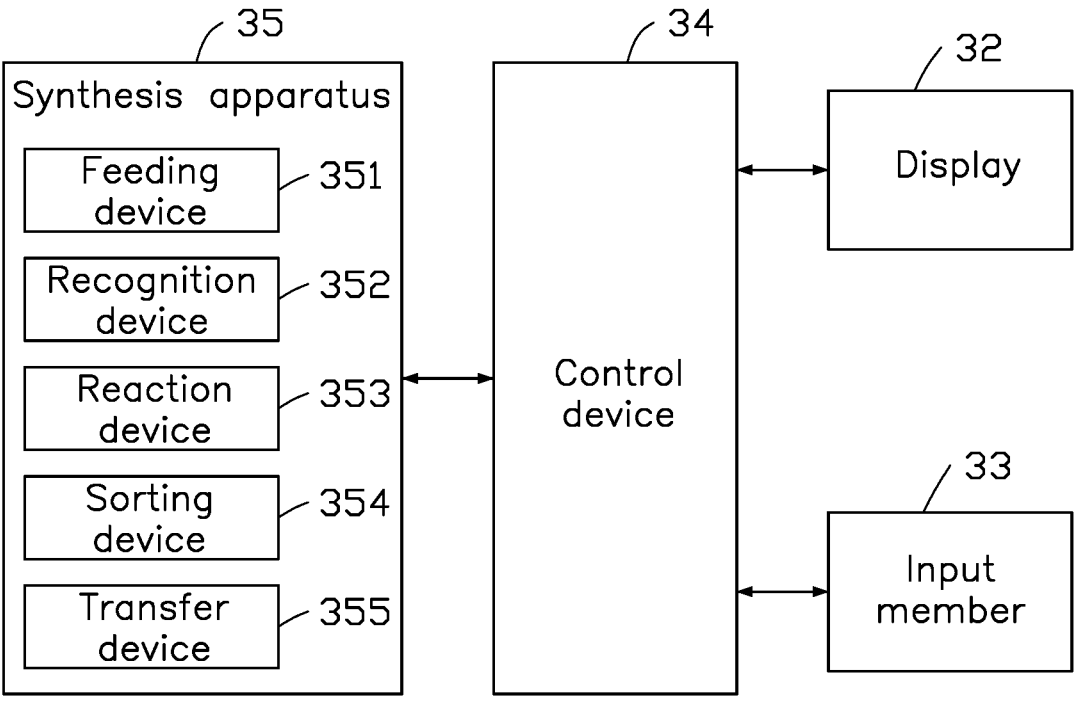
FIG. 3 is a diagram of components of the synthesizer of FIG. 2.

Referring to FIGS. 2 and 3, the synthesizer 30 is used to synthesize the biomacromolecules. In an embodiment, taking the synthesis of an oligonucleotide primer as an example, the synthesizer 30 includes a housing 31, and an output member (such as a display 32) and an input member 33 both fixed on the housing 31. In an embodiment, the display 32 and the input member 33 are integrated as a touch screen display. It may be understood that the input member 33 may also be set separately from the display 32, which includes a keyboard, a mouse, or another input device. The synthesizer 30 further includes a control device 34 and a synthesis apparatus 35 located in the housing 31. The control device 34 is communicated with each of the display 32, the input component 33, and the synthesis apparatus 35, and may be as large as a server, a host, or as small as a chip. The control device 34 is used to execute corresponding programs according to a content input by the input member 33, thereby controlling the synthesis apparatus 35 and display relevant information (such as abnormal information, completion information, etc.) on the display 32. The control device 34 may be arranged inside the housing 31 or outside the housing 31, and may be a local control device or a remote control device. The content input by the input member 33 may be used to set a synthesis reaction required for each biochip 20 or to define abnormal characteristics of an abnormal biochip 20 (for example, the identification is unrecognizable, etc.). At least one channel 36 connecting the inside of the synthesizer 30 is defined on the housing 31. The internal structure of the synthesizer 30 may be touched through the channel 36, and the biochip 20 used for the synthesis of the oligonucleotide primer may also be placed into the synthesizer 30 through the channel 36.

Figure 4:
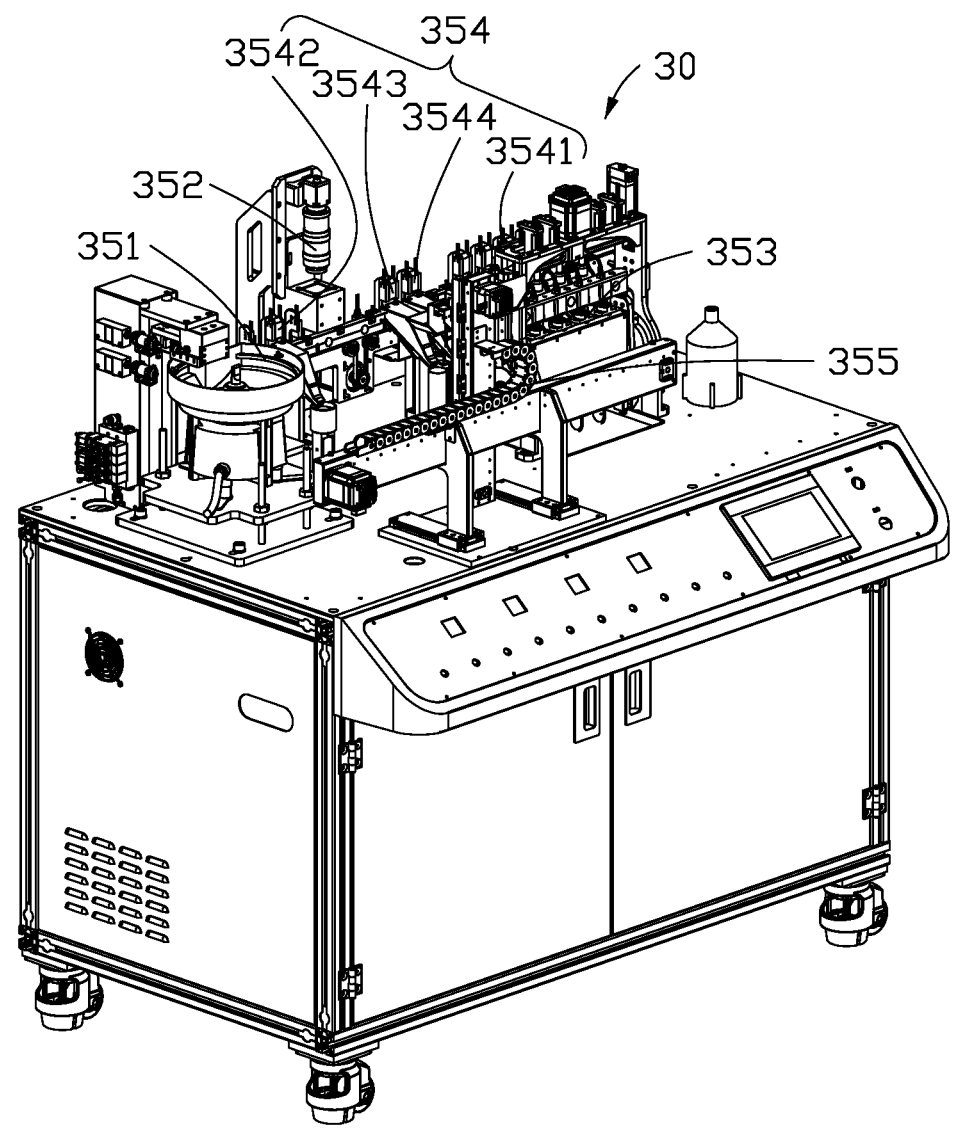
FIG. 4 is a stereoscopic view of the synthesizer of FIG. 2, when a housing thereof is partially removed.
Figure 5:
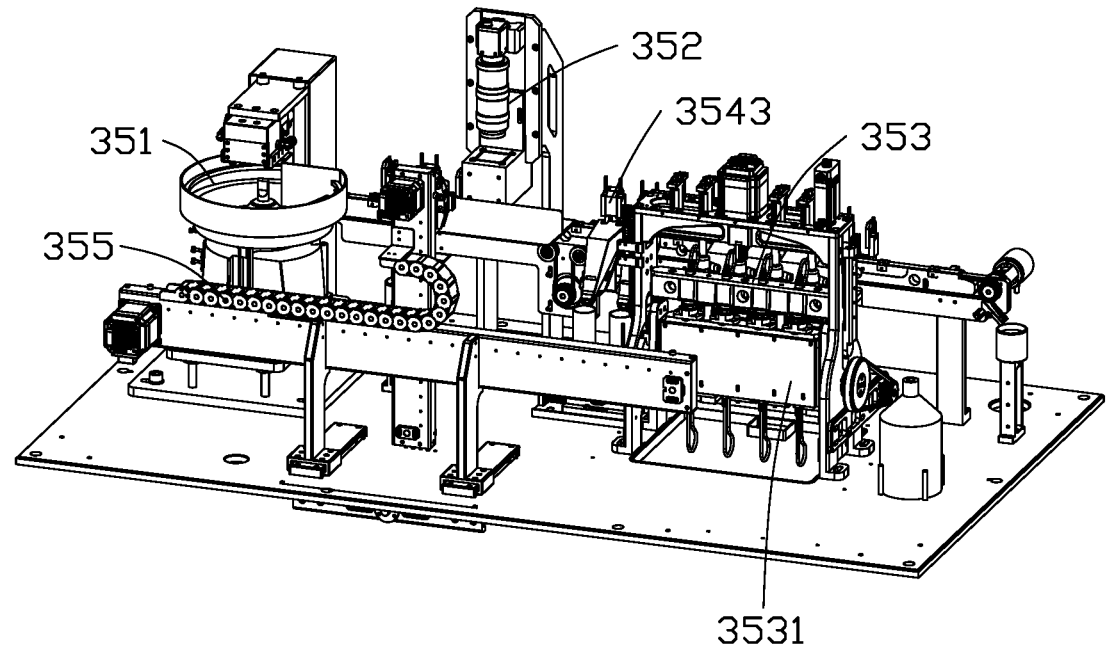
FIG. 5 is a stereoscopic view showing the synthesis apparatus of FIG. 4 from another angle.

Referring to FIGS. 4 and 5, the synthesis apparatus 35 includes a feeding device 351 for transporting the biochips 20, a recognition device 352 for recognizing the biochips 20, a reaction device 353 for performing the synthesis reaction on the biochips 20, a sorting device 354 for sorting the biochips 20, and a transfer device 355 for transferring the biochips 20.

Figure 6:
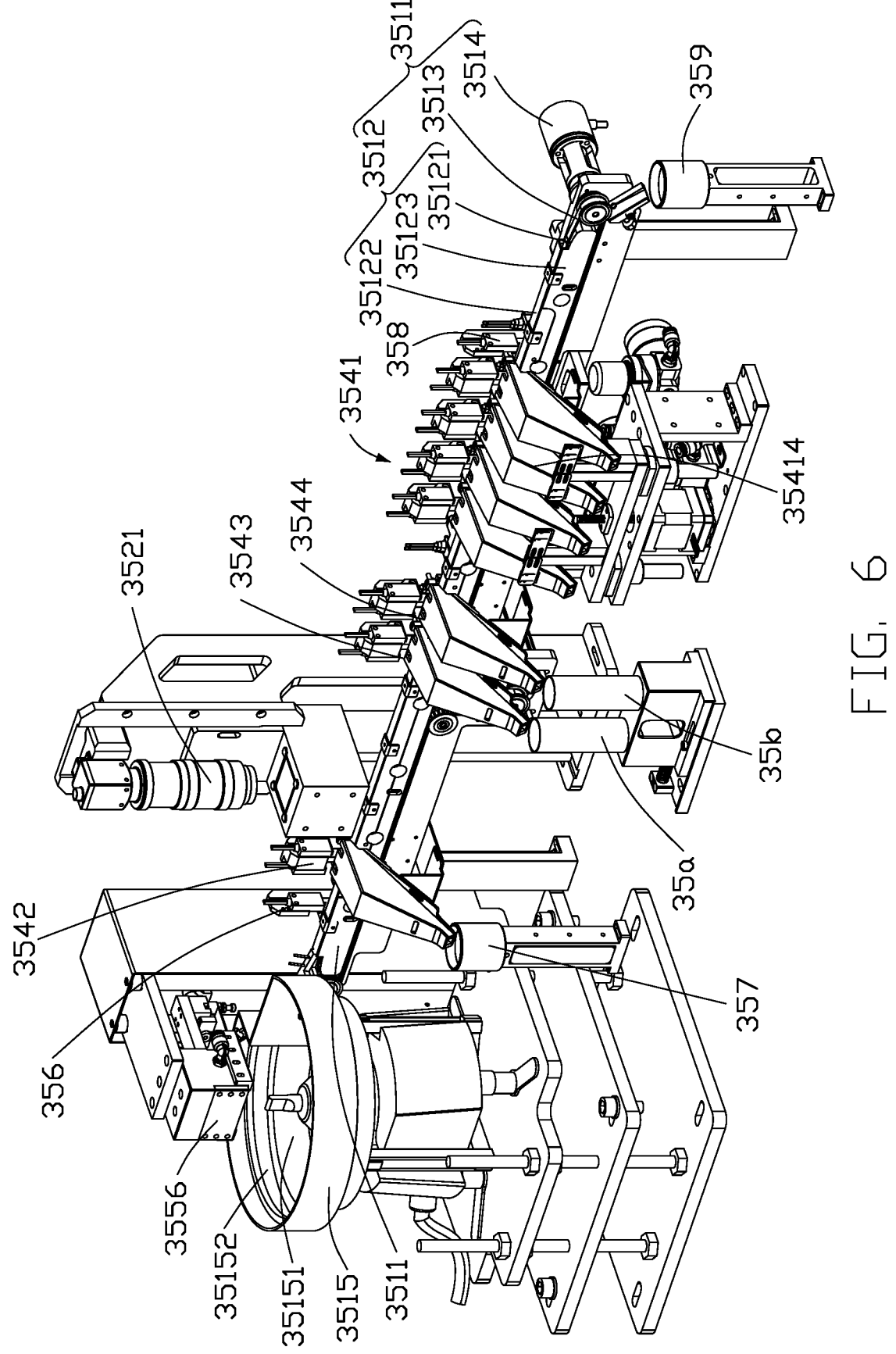
FIG. 6 is a stereoscopic view of the synthesis apparatus of FIG. 5, when a transfer device thereof is partially removed.
Figure 7:
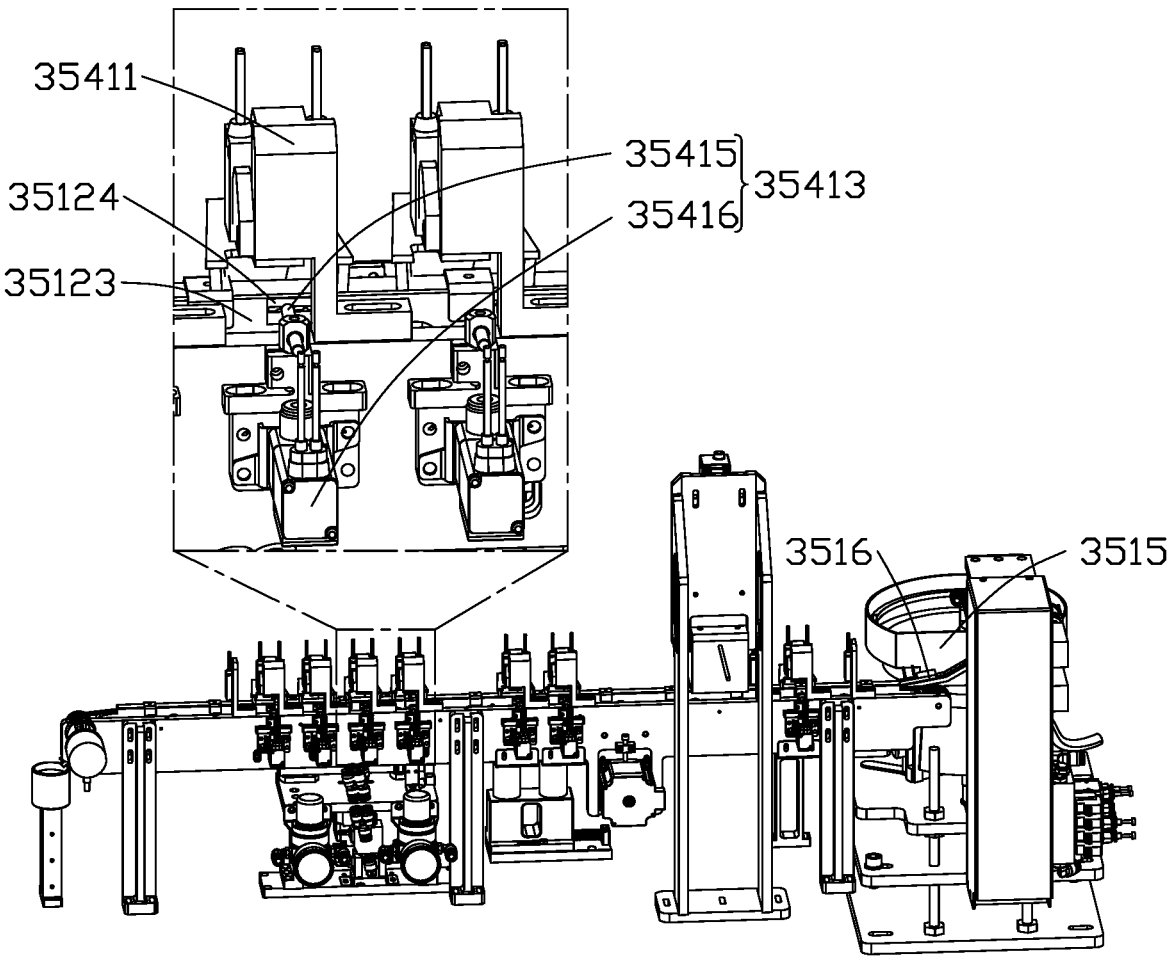
FIG. 7 is a stereoscopic view showing the synthesis apparatus of FIG. 6 from another angle.

Referring to FIGS. 6 and 7, the feeding device 351 includes a transporting assembly 3511 for simultaneously transporting a number of biochips 20. In an embodiment, the transporting assembly 3511 includes a guide rail 3512, a conveying belt 3513, and a first step motor 3514. The conveying belt 3513 is wound on the guide rail 3512 along an extended direction of the guide rail 3512, and further sleeved on an output shaft of the first step motor 3514. The conveying belt 3513 is used to move along the guide rail 3512 when driven by the first step motor 3514, thereby transporting the biochips 20 on the conveying belt 3513. Specifically, the guide rail 3512 includes a bottom plate 35121, a transparent cover plate 35122, and two limit plates 35123 connected between the bottom plate 35121 and the cover plate 35122 and opposite to each other. The first step motor 3514 is located at an end of the bottom plate 35121 away from the transporting assembly 3511. The conveying belt 3513 is located between the two limit plates 35123, one portion of the conveying belt 3513 is located between the bottom plate 35121 and the cover plate 35122, and the remaining portion is located outside the guide rail 3512.

The feeding device 351 further includes a vibrating disc 3515 with a feeding groove 35151 and a discharge port (not shown in the figure), and further includes a hollow guide member 3516. The guide member 3516 is communicated with the discharge port of the vibrating disc 3515. A vibrating rail 35152 is arranged in the vibrating disc 3515. The vibrating rail 35152 is in a circular and progressive shape, which is used to orderly arrange the biochips 20 that enter the feeding groove 35151 and output the biochips 20 to the guide member 3516. An end of the guide member 3516 away from the vibration disk 3515 is located above the transporting assembly 3511, which allows each biochip 20 that is output to the guide member 3516 to slide onto the transporting assembly 3511 under its own gravity.

The recognition device 352 is used to identify the identification of each biochip 20 located on the conveying belt 3513, and feed back an identification information generated therefrom to the control device 34.

The recognition device 352 includes an image capturing member 3521 and an image recognition member (not shown). The image capturing member 3521 is located above the transporting assembly 3511, and is used to capture the image of each biochips 20 transported by the transporting assembly 3511. The image recognition member is used to identify the identification of the biochip 20 according to the image of the biochip 20, and send the generated identification information to the control device 34. It may be understood that the image recognition member may also be set in the control device 34. The image capturing member 3521 transmits the captured image of the biochip 20 to the control device 34. The control device 34 recognizes the identification of the biochip 20 according to the image of the biochip 20, thereby obtaining the identification information.

Figure 8:
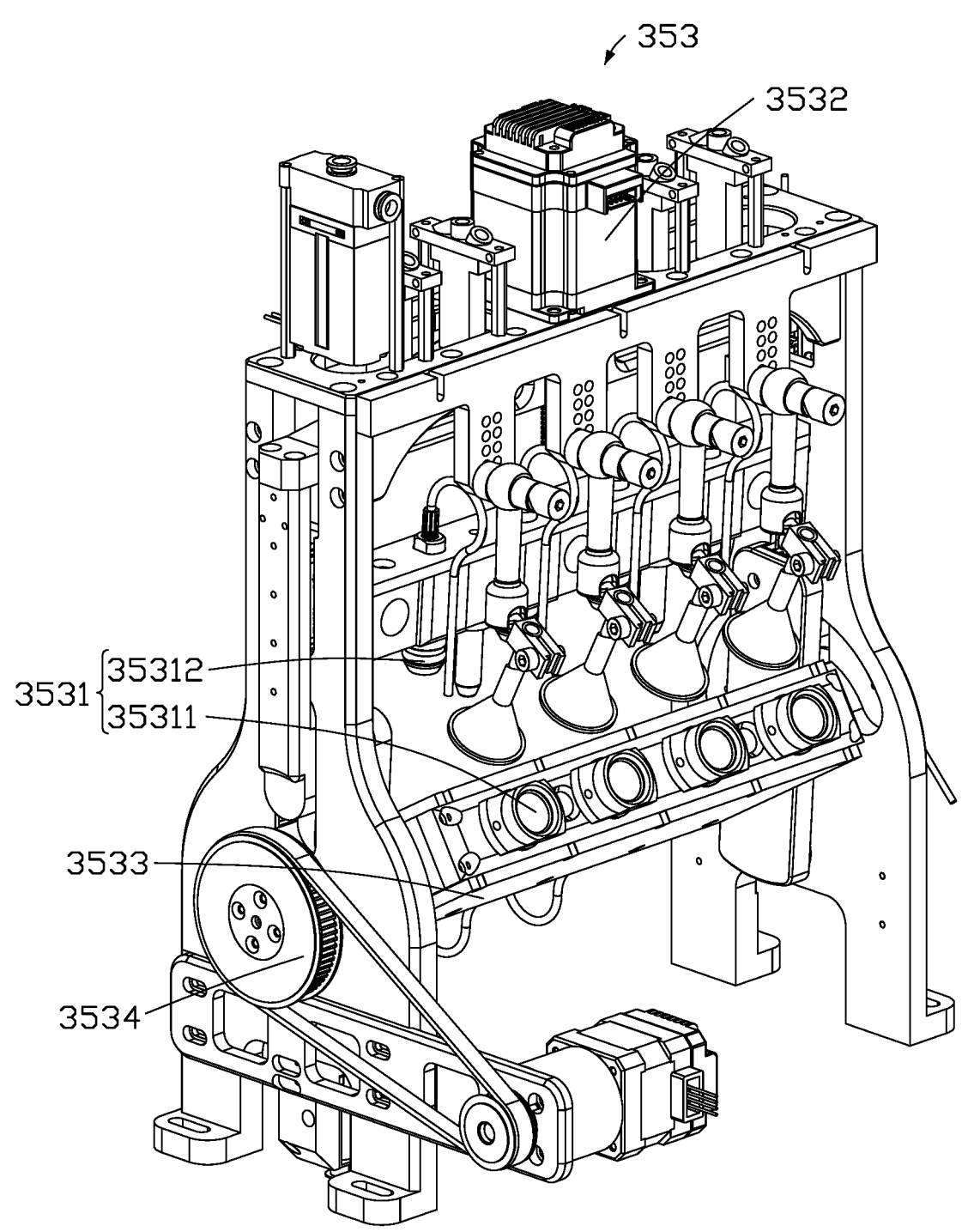
FIG. 8 is a stereoscopic view of a reaction device of FIG. 5, when the reaction device is rotated by an angle.

Referring to FIGS. 5 and 8, the reaction device 353 is located on a side of the recognition device 352 away from the feeding device 351, and includes a number of reaction vessels 3531. Each reaction vessel 3531 is used for the synthesis reaction or the cleaning of the biochip 20 located in the reaction vessel 3531. Each reaction vessel 3531 is for completing a different synthesis reaction. For example, the number of reaction vessels 3531 is four. The four reaction vessels 3531 are respectively used for the synthesis of adenine (A), thymine (T), cytosine (C), and guanine (G).

Specifically, each reaction vessel 3531 includes a synthesis reaction column 35311 and a sealing cover 35312 that may be opened and closed with respect to the synthesis reaction column 35311. The sealing cover 35312 is used to seal the synthesis reaction column 35311 to complete the synthesis reaction on the biochip 20. When the sealing cover 35312 does not cover the synthesis reaction column 35311, the biochip 20 can be placed into the synthesis reaction column 35311. The reaction device 353 further includes an opening and closing driver 3532. The opening and closing driver 3532 is connected to the sealing cover 35312, and is used to drive the sealing cover 35312 to move upwards and downwards, causing the sealing cover 35312 to leave or seal the synthesis reaction column 35311.

In an embodiment, the reaction vessels 3531 can rotate between a first position and a second position. The first position is a position for receiving the biochip 20. The second position is a position for discharging the biochip 20. Specifically, the reaction device 353 further includes a positioning body 3533 and a container driver 3534 connected to the positioning body 3533. The reaction vessels 3531 are arranged side-by-side and fixed on the positioning body 3533. The container driver 3534 is used to drive the positioning body 3533 to rotate by a preset angle along a first direction according to a rotation command from the control device 34, and further rotate along the opposite direction of the first direction back to its original position at a preset time after the positioning body 3533 rotates by the preset angle. Thus, the biochips 20 are discharged when the reaction vessels 3531 rotate by the preset angle, and the reaction vessels 3531 can further receive the biochips 20 after discharging the biochips 20. The control device 34 sends the rotation command to the container driver 3534 when the reaction devices 353 complete the synthesis reaction. The position of the positioning body 3533 after rotating by the preset angle along the first direction is the second position. The position of the positioning body 3533 after rotating along the direction opposite of the first direction is the first position.

Referring to FIGS. 6 and 7, the sorting device 354 includes a number of first sorting assemblies 3541. The first sorting assemblies 3541 are located on a side of the transporting assembly 3511 and correspond to the reaction vessels 3531. The control device 34 determines the synthesis sequence of each biochip 20 and the current synthesis reaction according to the identification information. When one biochip 20 is transported to the first sorting assembly 3541 corresponding to the reaction vessel 3531 for performing the current synthesis reactions, the control device 34 controls the first sorting assembly 3541 to sort the biochip 20 to the corresponding reaction vessel 3531.

In an embodiment, each first sorting assembly 3541 includes a site sensor 35411 and a selection device (not shown) corresponding to the site sensor 35411. The site sensor 35411 is located above the selection device, and is used to sense whether a biochip 20 has been transported to the site sensor 35411 and send a site sensing information to the control device 34. The control device 34 determines the synthesis sequence of the current biochip 20 and the current synthesis reaction according to the identification information of the current biochip 20, and determines according to the current synthesis reaction whether the biochip 20 sensed by the site sensor 35411 is sorted by the selection device corresponding to the site sensor 35411. When the site sensor 35411 senses that the biochip 20 is sorted by the selection device corresponding to the site sensor 35411, a sorting command is sent to the selection device corresponding to the site sensor 35411. The selection device is used to transfer the biochip 20 to the reaction vessel 3531 according to the sorting command.

To illustrate the working process of the first sorting assemblies 3541, the first sorting assemblies 3541 are set to be corresponding to the reaction vessels 3531 respectively for adenine synthesis, thymine synthesis, cytosine synthesis, and guanine synthesis along the direction away from the recognition device 352. One biochip 20 is transported to the recognition device 352, which recognizes the biochip 20. For example, the control device 34 determines that the current synthesis reaction performed on the biochip 20 is cytosine synthesis reaction according to the identification information. When the biochip 20 is transported to the site sensor 35411 nearest to the recognition device 352 (hereinafter, adenine synthesis site sensor for simplicity), the adenine synthesis site sensor detects the biochip 20. However, the biochip 20 is subjected to a cytosine synthesis reaction instead of the adenine synthesis reaction corresponding to the adenine synthesis site sensor. The control device 34 will not send the sorting command to the selection device corresponding to the adenine synthesis site sensor. As such, the biochip 20 will continue to be transported to the next site sensor 35411 (hereinafter, thymine synthesis site sensor for simplicity). Similarly, the control device 34 will not send the sorting command to the selection device corresponding to the thymine synthesis position sensor. The biochip 20 continues to be transported to the next site sensor 35411 (hereinafter, cytosine synthesis site sensor for simplicity). When the cytosine synthesis site sensor senses the biochip 20, since the synthesis reaction to be performed on the biochip 20 is the cytosine synthesis reaction corresponding to the cytosine synthesis site sensor, the control device 34 sends the sorting command to the selection device corresponding to the cytosine synthesis site sensor. Thus, the selection device sorts the biochip 20 to the corresponding reaction vessel 3531.

In an embodiment, the first sorting assembly 3541 includes a selection device, but does not include the site sensor 35411. The control device 34 determines the position of the biochip 20 according to a distance between the selection device and the recognition device 352, a time for obtaining the identification information of the biochip 20, and a speed of the transporting assembly 3511 for transporting the biochip 20, thereby determining whether the biochip 20 has been transported to the corresponding selection device.

In an embodiment, the selection device includes a gas supply device 35413 on a side of the transporting assembly 3511 and a storage device 35414 on another side of the transporting assembly 3511. The gas supply device 35413 is used to blow the corresponding biochip 20 to the storage device 35414 according to the sorting command from the control device 34. The storage device 35414 is used to transfer the biochip 20 to the corresponding reaction vessel 3531.

Specifically, the gas supply device 35413 includes a hollow nozzle 35415, a gas supply pipeline (not shown), and a switch 35416. The hollow nozzle 35415 is connected to the gas supply pipeline. The gas supply pipeline is used to receive a compressed gas. The limit plate 35123 of the transporting assembly 3511 forms a through hole 35124 aligned with the hollow nozzle 35415. The switch 35416 is used to control the gas supply pipeline to supply the gas to the nozzle 35415 according to the sorting command from the control device 34. When the switch 35416 is turned on, the compressed gas in the gas supply pipeline passes through the nozzle 35415 and then blows the biochip 20 to the corresponding storage device 35414 through the through hole 35124. In an embodiment, the switch 35416 is a solenoid valve.

Figure 9:
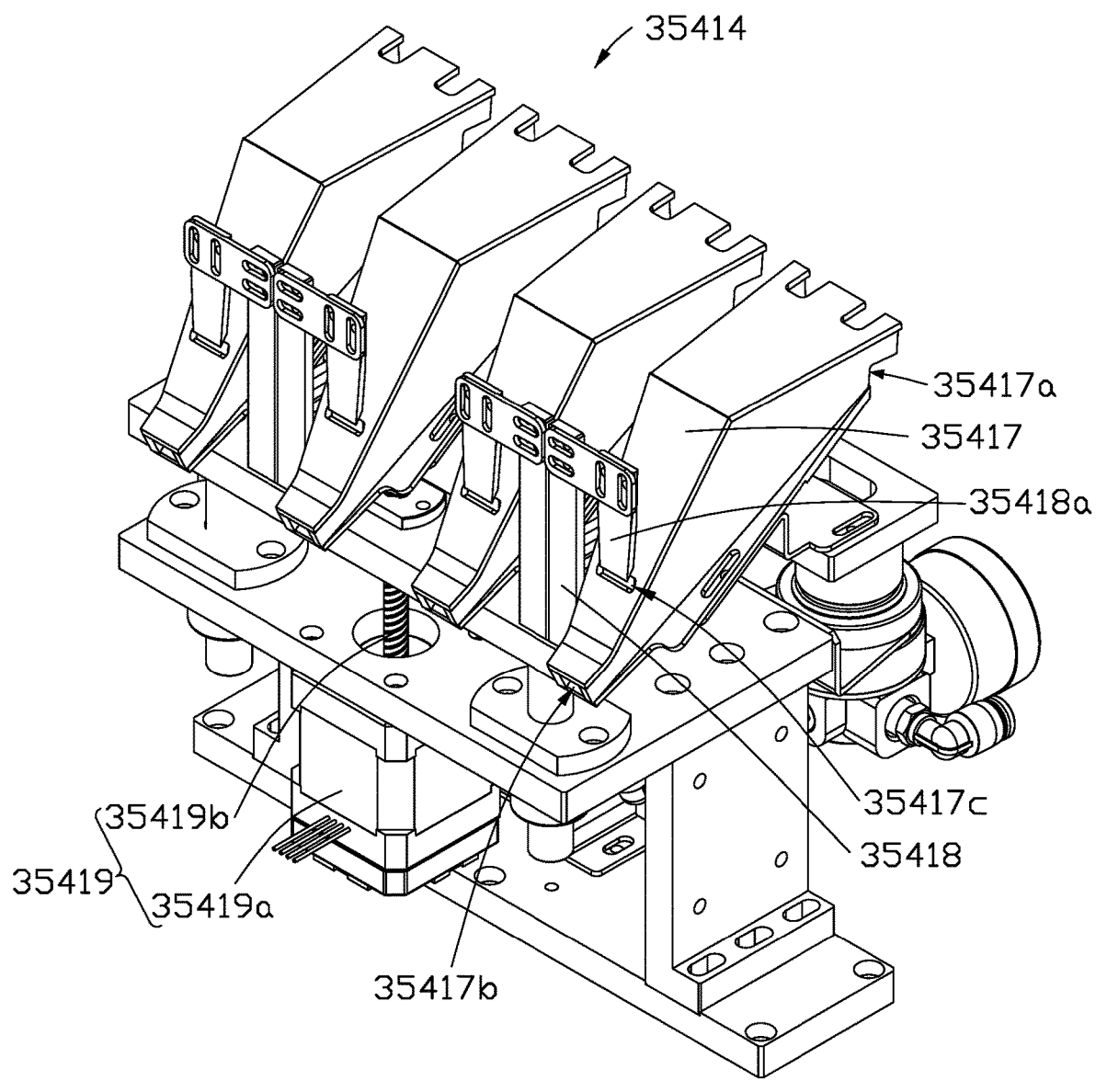
FIG. 9 is a stereoscopic view showing a storage device in the synthesis apparatus of FIG. 6 without blocking a biochip.

Referring to FIG. 9, the storage device 35414 includes a number of storage bins 35417 fixed on the transporting assembly 3511. Each storage bin 35417 includes an inlet 35417a and an outlet 35417b. The inlet 35417a faces one first sorting assembly 3541, and the outlet 35417b faces one reaction vessel 3531. The biochip 20 drops to the reaction vessel 3531 after passing through the inlet 35417a and outlet 35417b, so that the synthesis reaction is then performed in the reaction vessel 3531. The storage device 35414 further includes a lifting member 35418 and a lifting driver 35419. The lifting driver 35419 is mechanically connected to the lifting member 35418 and further communicated with the control device 34. The lifting driver 35419 is used to drive the lifting member 35418 to move toward or away from the storage bin 35417 according to a lifting command from the control device 34. The lifting member 35418 is used to block the biochip 20 located in the storage bin 35417 during the movement, and also allow the biochip 20 to drop to the reaction vessel 3531 through the outlet 35417b.

In an embodiment, the lifting drive 35419 includes a second step motor 35419a and a screw rod 35419b connected to the second step motor 35419a. The lifting member 35418 is movably sleeved on the screw rod 35419b, and the rotation of the screw rod 35419b drives the lifting member 35418 to move upwards and downwards. The control device 34 records the number of sorting by the first sorting assembly 3541 (i.e., the number of sorted biochips 20), and sends the lifting command to the lifting driver 35419 when the number of sorting reaches a preset number. Then, the lifting driver 35419 drives the lifting member 35418 to move upwards and downwards. The lifting member 35418 includes at least one suspended stopper 35418a. The stopper 35418a is used to block the biochip 20 in the storage bin 35417 when the lifting member 35418 move downwards, and also allow the biochip 20 to drop to the reaction vessel 3531 through the outlet 35417b when the lifting member 35418 move upwards. In an embodiment, a top surface of the storage bin 35417 has an opening 35417c at an end of the outlet 35417b. The stopper 35418a is used to be located in the opening 35417c to block the biochip 20. In an embodiment, the number of storage bins 35417 is four. The lifting member 35418 includes four stoppers 35418a. The four stoppers 35418a are respectively used to block the biochips 20 in the four storage bins 35417. It may be understood that the four stoppers 35418a may also be set on four separated lifting members 35418, and the four lifting members 35418 are respectively connected to four lifting drivers 35419. The control device 34 is used to control each lifting driver 35419 to drive the lifting member 35418 to move according to the number of sorting of each first sorting assembly 3541, so as to control the four lifting member 35418a to block the biochips 20.

The transfer device 355 is used to transfer the biochip 20 in the reaction vessel 3531 that completes the synthesis reaction to the feeding device 351 according to a transfer command from the control device 34. The control device 34 sends the transfer instruction when the biochip 20 in the reaction vessel 3531 completes the synthesis reaction. The biochip 20 transferred to the feeding device 351 by the transfer device 355 is further transferred by the transporting assembly 3511 for the next sorting. As such, a base component is synthesized in each cycle until the biochip 20 completes all synthesis tasks of the target synthesis sequence.

Figure 10:
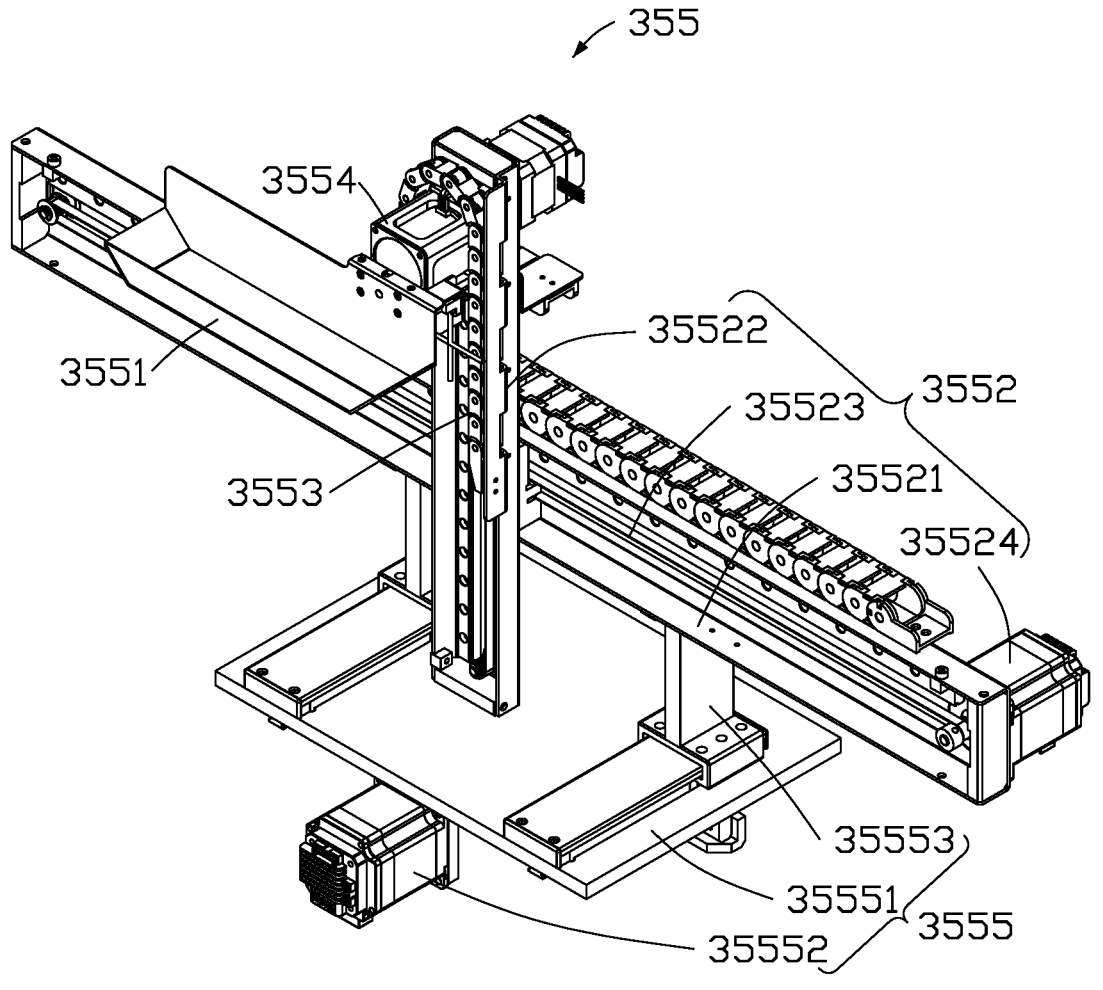
FIG. 10 is a stereoscopic view partially showing the transfer device in the synthesis apparatus of FIG. 5.

Referring to FIG. 10, the transfer device 355 includes a hopper 3551, a first hopper driver 3552, a second hopper driver 3553 connected to the first hopper driver 3552, and a third hopper driver 3554 connected to the hopper 3551 and the second hopper driver 3553. The first hopper driver 3552 is used to drive the hopper 3551 to move horizontally between a receiving position at a horizontal coordinate ($X_1$) and a loading position at a horizontal coordinate ($X_2$). The second hopper driver 3553 is used to drive the hopper 3551 to move vertically between the receiving position at a vertical coordinate ($Z_1$) and the loading position at a vertical coordinate ($Z_2$). The hopper 3551, when being located at the horizontal coordinate and the vertical coordinate of the receiving position, is used to receive the biochip 20 discharged from the reaction vessel 3531. The hopper 3551, when being located at the horizontal coordinate and the vertical coordinate of the loading position, is further used to discharge the biochip 20. The order that the hopper 3551 moves to the horizontal coordinate of the receiving position, the horizontal coordinate of the loading position, the vertical coordinate of the receiving position, and the vertical coordinate of the loading position, when being driven by of the first hopper driver 3552 and the second hopper driver 3553, is determined as needed. For example, for moving the hopper 3551 to the receiving position, the first hopper driver 3552 can first horizontally move the hopper 3551 from the loading position to the horizontal coordinate of the receiving position, and then the second hopper driver 3553 can vertically move the hopper 3551 down to the vertical coordinate of the receiving position. For example, the second hopper driver 3553 can first vertically move the hopper 3551 from the loading position down to the vertical coordinate of the receiving position, and then the first hopper driver 3552 can horizontally move the hopper 3551 to the horizontal coordinate of the receiving position. The third hopper driver 3554 is used to drive the hopper 3551 at the loading position to rotate. Thus, the hopper 3551 is switched between a horizontal state and a vertical state to receive the biochip 20 from the reaction vessel 3531 and discharge the biochip 20 to the feeding device 351.

Specifically, the first hopper driver 3552 includes a slide rail 35521, a fixing pillar 35522, a connecting member 35523, and a first driver 35524. The fixing pillar 35522 is slidably connected to the slide rail 35521 and perpendicular to the slide rail 35521. The connecting member 35523 is connected to the fixing pillar 35522 and the first driver 35524. The first driver 35524 is used to drive the connecting member 35523 to move back and forth, thus driving the fixing pillar 35522 to slide along the slide rail 35521. As such, the hopper 3551 can move to the receiving position or the loading position. In an embodiment, the first driver 35524 may be a step motor, and the connecting member 35523 may include a belt and a chain sleeved on the step motor. The fixing pillar 35522 includes a fixing block having a fixing slot. The belt is clamped in the fixing slot so that the fixing pillar 35522 is fixed to the belt. Thus, the fixing pillar 35522 can move together with the belt. An end of the chain is fixed on a top surface of the slide rail 35521, and the other end of the chain is connected to the fixing pillar 35522 through a fixing sheet. The chain is used to limit a moving length of the fixing pillar 35522 when the fixing pillar 35522 moves along the slide rail 35521. The components and operation principle of the second hopper driver 3553 are similar to those of the first hopper driver 3552, which will not be described.

In an embodiment, the transfer device 355 further includes a fourth hopper driver 3555. The fourth hopper driver 3555 is connected to the first hopper driver 3552, and is used to drive the hopper 3551 to move along a front and rear direction perpendicular to the horizontal and vertical directions between a first coordinate ($Y_1$) close to the reaction device 353 and a second coordinate ($Y_2$) away from the reaction device 353. The hopper 3551, when being at the first coordinate, is used to receive the biochip 20 from the reaction vessel 3531 at the receiving position or discharge the biochip 20 at the loading position. When the hopper 3551 moves from the first coordinate to the second coordinate, an enough distance exist between the hopper 3551 and the reaction device 353, which prevents the hopper 3551 from being blocked by the components between the reaction device 353 and the feeding device 351. Specifically, the fourth hopper driver 3555 includes a base 35551, a power member 35552, and a slide member 35553. The slide member 35553 is slidably connected to the base 35551 and further connected to the first hopper driver 3552. The power member 35552 is used to drive the slide member 35553 to slide forward and backward on the base 35551. The sliding of slide rail 35521 on the base 35551 is realized through a connection between slide slot and slide rail.

Furthermore, referring to FIG. 6, the synthesis apparatus 35 further includes a discharge sensor 356 and a first recovery vessel 357. The sorting device 354 further includes a second sorting assembly 3542. The transfer device 355 further includes a negative pressure reflux device (not shown) and a reflux storage device 3556. The discharge sensor 356 is located on a side of the recognition device 352 away from the first sorting assembly 3541, and is used to sense whether the biochip 20 is transported to a preset position and then transmit a discharge sensing information generated therefrom to the control device 34. The second sorting assembly 3542 is located between the discharge sensor 356 and the recognition device 352, and corresponds to the first recovery vessel 357. The control device 34 is also used to determine whether an interval between the times at which two adjacent biochips 20 are detected is less than a preset time according to the discharge sensing information. When the interval between the times at which two adjacent biochips 20 are detected is less than the preset time, the control device 34 is used to control the second sorting assembly 3542 to sort the biochip 20 to the first recovery vessel 357. When the interval between the times at which two adjacent biochips 20 are detected is less than the preset time, a distance between the two biochips 20 is indicated to be small. The biochip 20 close to the previous biochip 20 is sorted to the first recovery vessel 357 through the second sorting assembly 3542, which can avoid that the first sorting assembly 3541 cannot timely sort the two biochips 20 for performing the same current synthesis reaction into the same reaction vessel 3531 due to the small distance between biochips 20. At the same time, it can also avoid that the first sorting assembly 3541 mistakenly sorts two biochips 20 for performing different current synthesis reactions into the same reaction vessel 3531 due to the mall distance between the biochips 20. In an embodiment, the structure of the second sorting assembly 3542 is the same as that of the first sorting assembly 3541, which will not be repeated. The negative pressure reflux device is connected to the first recovery vessel 357, and is used to transport each biochip 20 in the first recovery vessel 357 to the reflux storage device 3556 when being driven by the control device 34. The reflux storage device 3556 is located above the feeding device 351, and is used to place each biochip 20 that has been transported to the reflux storage device 3556 to the feeding device 351.

Figure 11:
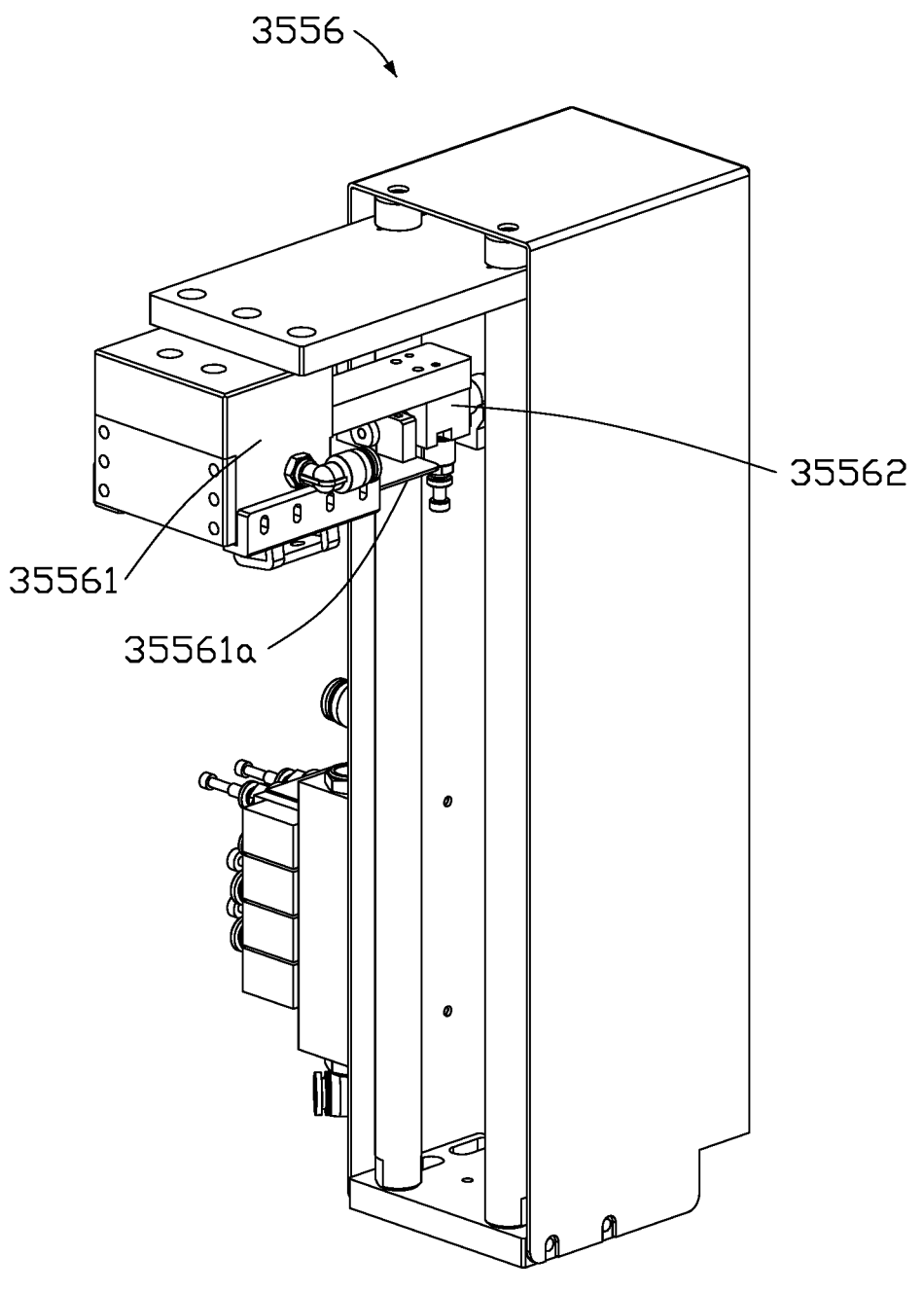
FIG. 11 is a stereoscopic view showing the transfer device of FIG. 10 from another angle.

Referring to FIG. 11, specifically, the reflux storage device 3556 includes a storage portion 35561 with a movable door 35561a, and also includes a cylinder 35562. The storage portion 35561 is used to store the biochip 20 transported by the negative pressure reflux device. The cylinder 35562 is used to drive the movable door 35561a to open and close when controlled by the control device 34. When the movable door 35561a is opened, the biochip 20 can drop from the storage portion 35561 to the feeding device 351.

Referring to FIG. 6, the synthesis apparatus 35 further includes a residue sensor 358 and a second recovery vessel 359. The residue sensor 358 is located at an end of the first sorting assemblies 3541 away from the recognition device 352, and is used to sense whether a biochip 20 has been transported to a predetermined position and transmit a residue sensing information generated therefrom to the control device 34. The second recovery vessel 359 is located at an end of the transporting assembly 3511 away from the feeding device 351, and is used to receive the biochip 20 residual from the transporting assembly 3511 that has not been successfully sorted. As such, the biochip 20, which is not successfully blown to the storage device 35414 due to the insufficient gas supply of the air supply device 35413 and still be placed on the transporting assembly 3511, can be ensured to be recycled. In an embodiment, the biochip 20 is placed on the belt of the transporting assembly 3511. The second recovery vessel 359 is located at an end of the traveling route of the belt, and is used to receive each biochip 20 that has been transported to the end of the traveling route of the belt. The negative pressure reflux device is further connected to the second recovery vessel 359, and is used to transport the biochip 20 in the second recovery vessel 359 to the reflux storage device 3556 when controlled by the control device 34. The control device 34 controls the negative pressure reflux device to transport the biochip 20 located in the second recovery vessel 359 to the reflux storage device 3556 when the number of the residual biochips 20 reaches a preset number. Therefore, when the sorting device 354 fails to successfully sort the biochip 20 into the corresponding reaction vessel 3531, the biochip 20 can successively pass the second recovery vessel 359, the negative pressure reflux device, and the reflux storage device 3556 to the feeding device 351 again, so that the biochip 20 can be transported to the transporting assembly 3511 for the next sorting.

The synthesis apparatus 35 further includes a waste recovery vessel 35a and a finished material recovery vessel 35b. The sorting device 354 further includes a third sorting assembly 3543 and a fourth sorting assembly 3544. The third sorting assembly 3543 is located between the recognition device 352 and the first sorting assembly 3541, and corresponds to the waste recovery vessel 35a. The control device 34 determines whether the biochip 20 is a waste according to the identification information. When the biochip 20 is a waste and is transported to the third sorting assembly 3543, the control device 34 controls the third sorting assembly 3543 to sort the biochip 20 to the waste recovery vessel 35a. The fourth sorting assembly 3544 is located between the recognition device 352 and the first sorting assembly 3541, and corresponds to the finished material recovery vessel 35b. The control device 34 determines whether the biochip 20 completes all synthesis reactions according to the identification information. When the biochip 20 completes all synthesis reactions and is transported to the fourth sorting assembly 3544, the control device 34 controls the fourth sorting assembly 3544 to sort the biochip 20 to the finished material recovery vessel 35b. In an embodiment, the structure of each of the third sorting assembly 3543 and the fourth sorting assembly 3544 is the same as that of the first sorting assembly 3541, which will not be repeated.

Figure 12:
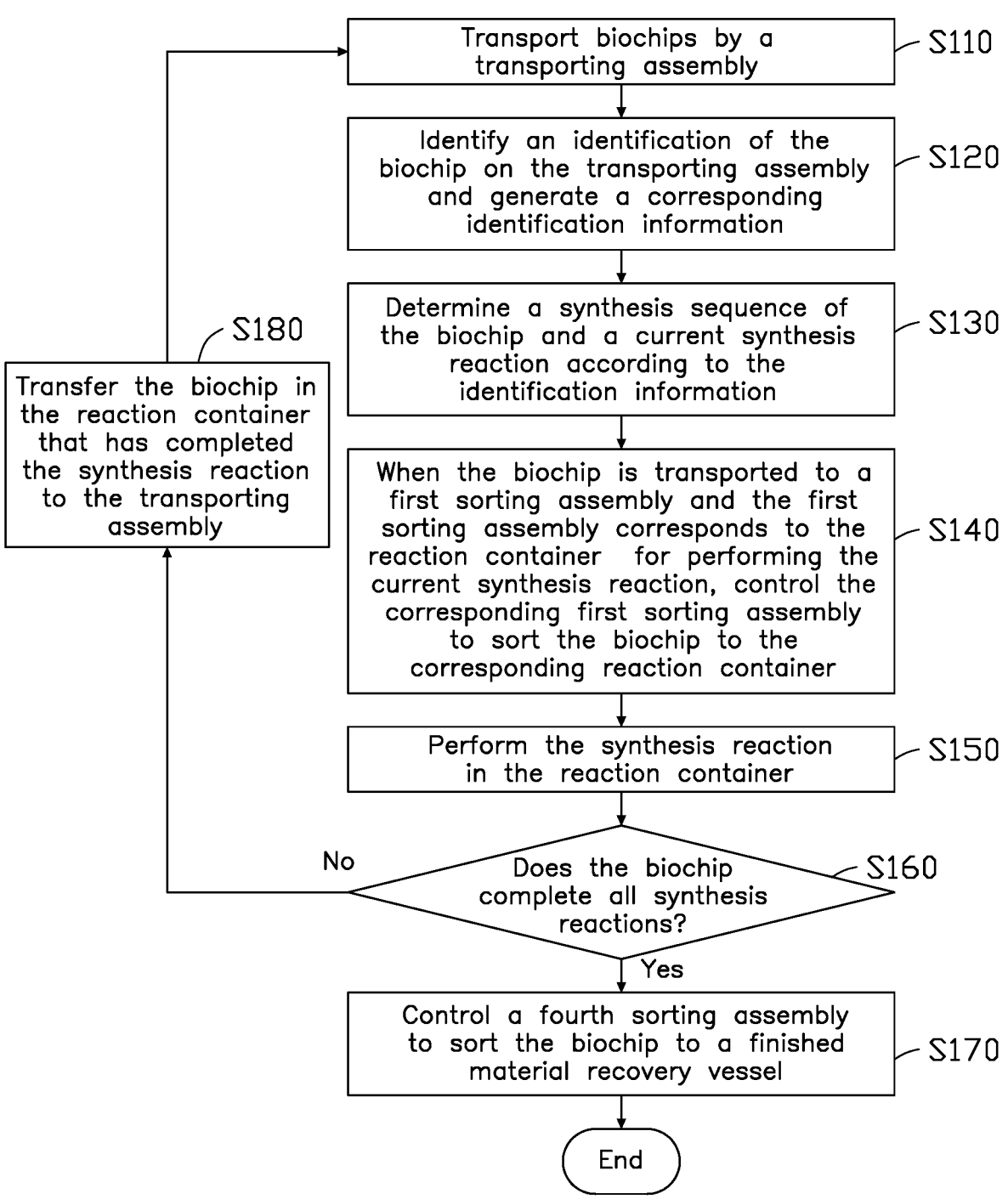
FIG. 12 is a flowchart of a synthesis method according to an embodiment of the present disclosure.

Referring to FIG. 12, a flowchart of a synthesis method of biomacromolecules is illustrated, which includes the following steps.

Step S110, a number of biochips are transport by a transporting assembly. A side of the transporting assembly is provided with a number of first sorting assemblies corresponding to a number of reaction vessels, a fourth sorting assembly, and a finished material recovery vessel corresponding to the fourth sorting assembly.

Step S120, an identification of each biochip located on the transporting assembly is identified, and a corresponding identification information is generated.

Step S130, a synthesis sequence of the biochip and a current synthesis reaction are determined according to the identification information.

Step S140, when the biochip is transported to a first sorting assembly and the first sorting assembly corresponds to the reaction vessel for performing the current synthesis reaction, the corresponding first sorting assembly is controlled to sort the biochip to the corresponding reaction vessel.

Step S150, the synthesis reaction is performed in the reaction vessel.

Step S160, whether the biochip has completed all synthesis reactions is determined according to the identification information. If all synthesis reactions are completed, the procedure goes to step S170; otherwise, the procedure goes to step S180.

Step S170, the fourth sorting assembly is controlled to sort the biochip to the finished material recovery vessel, and the procedure returns back to step S110.

Step S180, the biochip in the reaction vessel that has completed the synthesis reaction is transferred to the transporting assembly.

Figure 13:
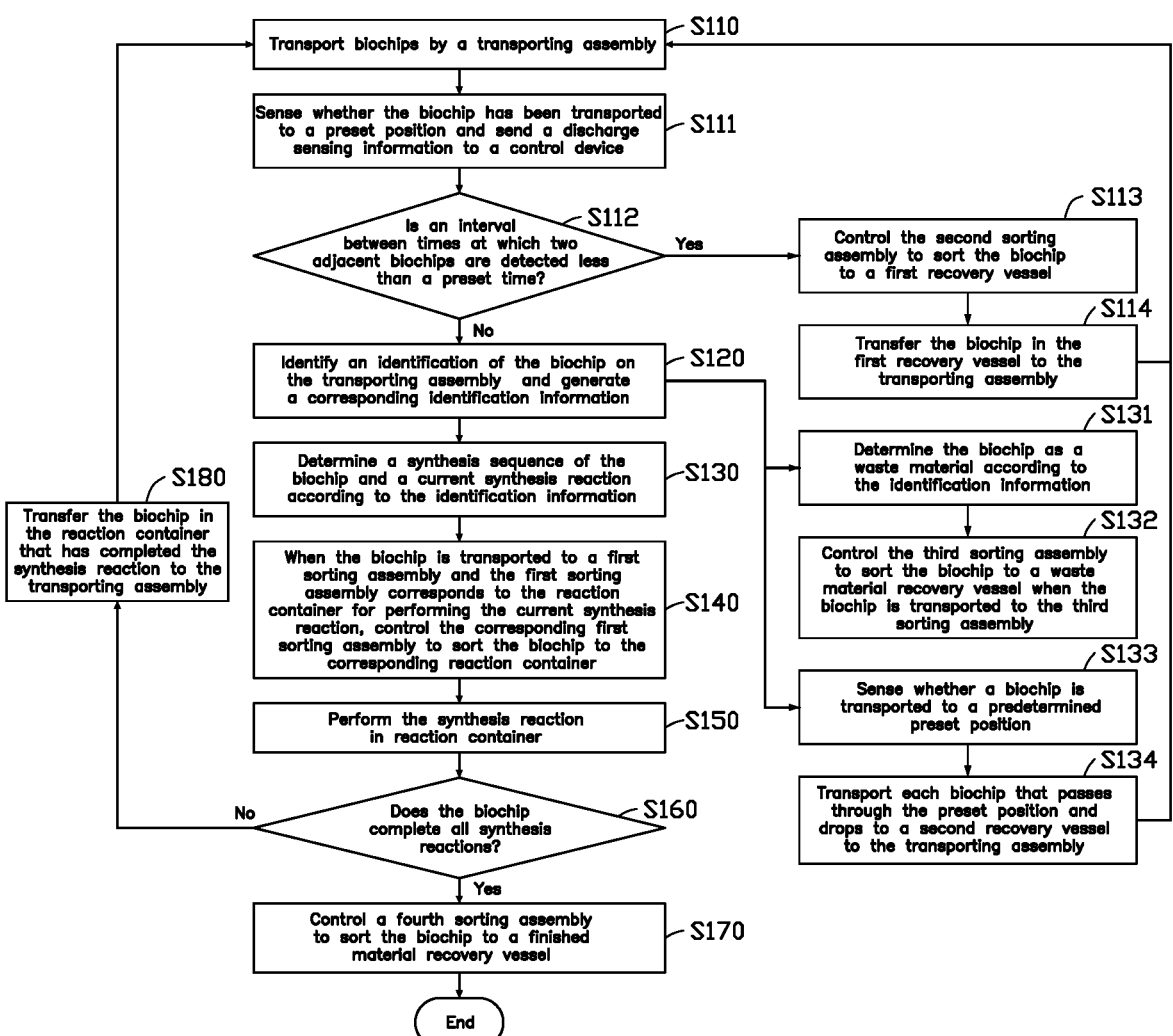
FIG. 13 is a flowchart of a synthesis method according to another embodiment of the present disclosure.

Referring to FIG. 13, in another embodiment, besides the steps S110 to S180 mentioned above, the synthesis method of biomacromolecules further includes step S111 before the step S120, at which whether the biochip has been transported to a preset position is sensed, and a discharge sensing information is generated and sent to the control device. Accordingly, a side of the transporting assembly is further provided with a second sorting assembly and a first recovery vessel corresponding to the second sorting assembly. The synthesis method of biomacromolecules further includes the following steps S112 to S113.

Step S112, whether an interval between the times at which two adjacent biochips are detected is less than a preset time is determined according to the discharge sensing information. When it is less than the preset time, the procedure goes to step S113; otherwise, the procedure goes to step S120.

Step S113, the second sorting assembly is controlled to sort the biochip to the first recovery vessel, and the procedure goes to step S114 after completing the step S113.

Step S114, each biochip in the first recovery vessel is transferred to the transporting assembly, and the procedure returns to the step S110.

The biomacromolecule synthesis method further includes step S131 that is executed simultaneously to the step S130. At the step S131, the biochip is determined as a waste according to the identification information. Accordingly, a side of the transporting assembly is further provided with a third sorting assembly and a waste recovery vessel corresponding to the third sorting assembly. The synthesis method of biomacromolecules further includes the following step S132.

Step S132, the third sorting assembly is controlled to sort the biochip to the waste recovery vessel when the biochip is transported to the third sorting assembly.

The synthesis method of biomacromolecules further includes step S133, at which whether a biochip is transported to a predetermined position is sensed. Accordingly, an end of the transporting assembly is provided with a second recovery vessel. The synthesis method of biomacromolecules further includes step S134 after the step S133, at which each biochip that passes through the predetermined position and drops to the second recovery vessel is transported to the transporting assembly, and the procedure returns to the step S110.

In the synthesizer and the synthesis method, multiple biochips placed on the transporting assembly can be simultaneously sorted by the first sorting assemblies arranged on a side of the transporting assembly, which improves the sorting efficiency of the biochips and shortening the synthesis cycle. In addition, since the reaction vessels correspond to the first sorting assemblies, the biochip may be sorted to the corresponding reaction vessel according to the identification information of the biochip. During the synthesis process, even when the synthesis sequence of the biochip is modified or added, the modified or newly added synthesis sequence may be adapted by changing the sorting order, so as to achieve a higher degree of freedom of synthesis.

Even though information and advantages of the embodiments have been set forth in the foregoing description, together with details of the structures and functions of the embodiments, the present disclosure is illustrative only. Changes may be made in detail, especially in matters of shape, size, and arrangement of parts within the principles of the present exemplary embodiments, to the full extent indicated by the plain meaning of the terms in which the appended claims are expressed.

What is claimed is:

1. A synthesis apparatus for synthesizing biomacromolecules, comprising:

a feeding device, a recognition device, a reaction device, a sorting device, and a transfer device;

wherein the feeding device comprises a transporting assembly configured to simultaneously transport a plurality of biochips;

the recognition device is configured to identify an identification of each of the plurality of biochips located on the transporting assembly and generate an identification information;

the reaction device comprises a plurality of reaction vessels in which synthesis reactions are performed on the plurality of biochips;

the sorting device comprises a plurality of first sorting assemblies located on a side of the transporting assembly and corresponding to the plurality of reaction vessels, the plurality of first sorting assemblies is configured to sort the plurality of biochips located on the transporting assembly to the plurality of reaction vessels, and each of the plurality of reaction vessels corresponding to a current synthesis reaction performed on a respective one of the plurality of biochips;

the transfer device is configured to transfer the plurality of biochips in the plurality of reaction vessels to the feeding device.

2. The synthesis apparatus according to claim 1, further comprising a waste recovery vessel, wherein the sorting device further comprises a third sorting assembly, the third sorting assembly is located between the recognition device and the plurality of first sorting assemblies and corresponds to the waste recovery vessel; the third sorting assembly is configured to sort one of the plurality of biochips which is determined as a waste into the waste recovery vessel.

3. The synthesis apparatus according to claim 1, further comprising a finished material recovery vessel, wherein the sorting device further comprises a fourth sorting assembly, the fourth sorting assembly is located between the recognition device and the plurality of first sorting assemblies and corresponds to the finished material recovery vessel; the fourth sorting assembly is configured to sort one of the plurality of biochips which completes all synthesis reactions to the finished material recovery vessel.

4. The synthesis apparatus according to claim 1, wherein each of the plurality of first sorting assemblies comprises a site sensor and a selection device corresponding to the site sensor, the site sensor is configured to sense whether one of the plurality of biochips has been transported to the site sensor and generate a site sensing information, the selection device is configured to transfer the one of the plurality of biochips to a respective one of the plurality of reaction vessels.

5. The synthesis apparatus according to claim 4, wherein the selection device comprises a gas supply device on a side of the transporting assembly and a storage device on another side of the transporting assembly, the gas supply device is configured to blow the one of the plurality of biochips to the storage device, the storage device is configured to transfer the one of the plurality of biochips to a respective one of the plurality of reaction vessels.

6. The synthesis apparatus according to claim 1, further comprising a discharge sensor and a first recovery vessel, wherein the sorting device further comprises a second sorting assembly; the discharge sensor is located on a side of the recognition device away from the plurality of first sorting assemblies, and is configured to sense whether one of the plurality of biochips has been transported to a preset position and generate a discharge sensing information; the second sorting assembly is located between the discharge sensor and the recognition device and corresponds to the first recovery vessel, the second sorting assembly is configured to sort the one of the plurality of biochips to the first recovery vessel.

7. The synthesis apparatus according to claim 6, wherein the transfer device further comprises a negative pressure reflux device and a reflux storage device; the negative pressure reflux device is connected to the first recovery vessel, and is configured to transport the one of the plurality of biochips in the first recovery vessel to the reflux storage device; the reflux storage device is configured to place the one of the plurality of biochips from the reflux storage device to the feeding device.

8. The synthesis apparatus according to claim 7, further comprising a residue sensor and a second recovery vessel, wherein the residue sensor is located at an end of the plurality of first sorting assemblies away from the recognition device, and is configured to sense whether one of the plurality of biochips has been sent to a predetermined position and generate a residue sensing information; the second recovery vessel is placed at an end of the transporting assembly away from the feeding device, and is configured to receive one of the plurality of biochips from the transporting assembly which is not successfully sorted; the negative pressure reflux device is further configured to transport the one of the plurality of biochips in the second recovery vessel to the reflux storage device.

9. A synthesizer, comprising:
a synthesis apparatus comprising feeding device, a recognition device, a reaction device, a sorting device, and a transfer device;
a control device; and
an input member and an output member each connected to the control device;
wherein the feeding device comprises a transporting assembly configured to simultaneously transport a plurality of biochips;
the recognition device is configured to identify an identification of each of the plurality of biochips located on the transporting assembly and feed back an identification information to the control device;
the reaction device comprises a plurality of reaction vessels in which synthesis reactions are performed on the plurality of biochips;
the sorting device comprises a plurality of first sorting assemblies located on a side of the transporting assembly and corresponding to the plurality of reaction vessels, the plurality of first sorting assemblies is configured to sort the plurality of biochips located on the transporting assembly to the plurality of reaction vessels, and each of the plurality of reaction vessels corresponding to a current synthesis reaction performed on a respective one of the plurality of biochips when controlled by the control device;
the transfer device is configured to transfer the plurality of biochips in the plurality of reaction vessels to the feeding device;
wherein the control device is configured to execute corresponding programs to control the synthesis apparatus to operate according to a content input from the input member, and display relevant information on the output member.

10. The synthesizer according to claim 9, wherein the synthesis apparatus further comprises a waste recovery vessel, the sorting device further comprises a third sorting assembly, the third sorting assembly is located between the recognition device and the plurality of first sorting assemblies and corresponds to the waste recovery vessel; the third sorting assembly is configured to sort one of the plurality of biochips which is determined as a waste into the waste recovery vessel when controlled by the control device.

11. The synthesizer according to claim 9, wherein the synthesis apparatus further comprises a finished material recovery vessel, the sorting device further comprises a fourth sorting assembly, the fourth sorting assembly is located between the recognition device and the plurality of first sorting assemblies and corresponds to the finished material recovery vessel; the fourth sorting assembly is configured to sort one of the plurality of biochips which completes all synthesis reactions to the finished material recovery vessel when controlled by the control device.

12. The synthesizer according to claim 9, wherein each of the plurality of first sorting assemblies comprises a site sensor and a selection device corresponding to the site sensor, the site sensor is configured to sense whether one of the plurality of biochips has been transported to the site sensor and send a site sensing information to the control device, the selection device is configured to transfer the one of the plurality of biochips to a respective one of the plurality of reaction vessels.

13. The synthesizer according to claim 12, wherein the selection device comprises a gas supply device on a side of the transporting assembly and a storage device on another side of the transporting assembly, the gas supply device is configured to blow the one of the plurality of biochips to the storage device when controlled by the control device, the storage device is configured to transfer the one of the plurality of biochips to a respective one of the plurality of reaction vessels.

14. The synthesizer according to claim 9, wherein the synthesis apparatus further comprises a discharge sensor and a first recovery vessel, the sorting device further comprises a second sorting assembly; the discharge sensor is located on a side of the recognition device away from the plurality of first sorting assemblies, and is configured to sense whether one of the plurality of biochips has been transported to a preset position and transmit a discharge sensing information to the control device; the second sorting assembly is located between the discharge sensor and the recognition device and corresponds to the first recovery vessel, the second sorting assembly is configured to sort the one of the plurality of biochips to the first recovery vessel when controlled by the control device.

15. The synthesizer according to claim 14, wherein the transfer device further comprises a negative pressure reflux device and a reflux storage device; the negative pressure reflux device is connected to the first recovery vessel, and is configured to transport the one of the plurality of biochips in the first recovery vessel to the reflux storage device when controlled by the control device; the reflux storage device is configured to place the one of the plurality of biochips from the reflux storage device to the feeding device.

16. The synthesizer according to claim 15, wherein the synthesis apparatus further comprises a residue sensor and a second recovery vessel, the residue sensor is located at an end of the plurality of first sorting assemblies away from the recognition device, and is configured to sense whether one of the plurality of biochips has been sent to a predetermined position and transmit a residue sensing information to the control device; the second recovery vessel is placed at an end of the transporting assembly away from the feeding device, and is configured to receive one of the plurality of biochips from the transporting assembly which is not successfully sorted; the negative pressure reflux device is further configured to transport the one of the plurality of biochips in the second recovery vessel to the reflux storage device.

17. A synthesis method of biomacromolecules, comprising:

transporting, by a transporting assembly, a plurality of biochips, wherein a plurality of first sorting assemblies corresponding to a plurality of reaction vessels is arranged on a side of the transporting assembly;

identifying an identification of each of the plurality of biochips located on the transporting assembly and generating an identification information accordingly;

determining a synthesis sequence and a current synthesis reaction of each of the plurality of biochips according to the identification information;

when one of the plurality of biochips has been transported to one of the plurality of first sorting assemblies and the one of the plurality of first sorting assemblies corresponds to one of the plurality of reaction vessels for performing the current synthesis reaction, controlling the one of the plurality of first sorting assemblies to sort the one of the plurality of biochips to the corresponding one of the plurality of reaction vessels;

performing the synthesis reaction in the corresponding one of the plurality of reaction vessels; and transferring the one of the plurality of biochips in the corresponding one of the plurality of reaction vessels to the transporting assembly.

\* \* \* \* \*